United States Patent [19]

Nam

[11] Patent Number: 5,111,300
[45] Date of Patent: May 5, 1992

[54] STILL VIDEO CAMERA WITH A MULTI-SCREEN MEMORY

[75] Inventor: Seok-Hoon Nam, Seoul, Rep. of Korea

[73] Assignee: SamSung Electronic Co., Ltd., Kyung Ki-Do, Rep. of Korea

[21] Appl. No.: 635,871

[22] Filed: Dec. 28, 1990

[30] Foreign Application Priority Data

Dec. 29, 1989 [KR] Rep. of Korea ............... 1989-20142

[51] Int. Cl.$^5$ .............................................. H04N 5/30
[52] U.S. Cl. .................................. 358/209; 358/909; 358/906
[58] Field of Search ............... 358/209, 909, 906, 310, 358/312, 335; 360/35.1, 33.1

[56] References Cited

U.S. PATENT DOCUMENTS

| | | | |
|---|---|---|---|
| 4,763,208 | 8/1988 | Kawamura et al. | 360/33.1 |
| 4,827,347 | 5/1989 | Bell | 358/224 |
| 4,982,291 | 1/1991 | Kurahashi et al. | 358/335 |

Primary Examiner—Howard W. Britton
Assistant Examiner—Tuan V. Ho
Attorney, Agent, or Firm—Robert E. Bushnell

[57] ABSTRACT

The invention is disclosed to provide a still video camera for reproducing a plurality of image source signals recorded in a plurality of recording tracks on a plurality of sub-screens, or reproducing an image source signal recorded in one track on a plurality of sub-screens, by using a multi-screen memory. The still video camera having a modulator, a recording/reproducing amplifier, a demodulator, a camera controller, and reproducer controller, includes a microprocessor for generating recording/reproducing commands, a multi-screen controller for generating A/D and D/A sampling clocks, a multi-screen recording/reproducing control signal, first and second switching control signals, an A/D converter for converting the modulated analog signals into digital signals, an analog switch for supplying the luminance signal, the first and second chrominance signals to the A/D converter, multi-screen memories for recording multi-screen image source signals in response to the control signal from the multi-screen controller, a plurality of D/A converters for generating the luminance signal, and the first and second chrominance signals into analog signals, a video switch for switching the above luminance and chrominance signals, and an encoder for encoding the signals passed through the video switch and a sysnchronizing signal so as to generate composite image signals.

1 Claim, 4 Drawing Sheets

STILL VIDEO CAMERA WITH A MULTI-SCREEN MEMORY

BACKGROUND OF THE INVENTION

This invention relates to a still video camera, particularly to a circuit for the still video camera with capability for reproducing and displaying a plurality of pictures on one screen by using a multi-screen memory.

In general, the still video camera stores pictured still images of subjects in a memory and reproduces the images. The stored images are printed by a video printer, or displayed on a monitor. A floppy disc is used as a memory element.

FIG. 1 represents the circuit of a conventional still video camera which includes a image sensor for converting an image signal of a subject received through lens into an electric signal, a signal processing unit for dividing the electric signal from the image sensor into chrominance signals of red (R), green (G), and blue (B) and a luminance signal, a camera controller for controlling camera functions according to signal selection of first and second switches for functioning to selectively display a desired screen and the next screen or to erase the present screen, a reproducer controller for controlling the display modes according to a function selection of the second switch, a mechanical controller for controlling mechanical operation of the camera, connected to the camera controller and the reproducer controller via bus lines, a floppy disc driver being driven by the mechanical controller, a motor driving unit controlled by the mechanical controller, an erasing unit for generating a screen erasing signal for the floppy disc driver, controlled by the mechanical controller, a modulator for frequency modulating the output from the signal processing unit, a recording/reproducing amplifier for mixing, switching and amplifying the chrominance signal and the luminance signal generated from the modulator in case of recording, and for amplifying the image signal read through a head of the floppy disc driver in case of reproducing, an automatic gain controller (hereinafter, referred to as AGC) for radio frequency signal processing the image signal recorded in the floppy disc driver through the recording/reproducing amplifier in case of reproducing, a demodulator for demodulating the output from the AGC, an encoder for generating a video signal by mixing the chrominance signal and the luminance signal respectively demodulated through the demodulator and then converting the signals into R, G, B signals, a timing generator for controlling the image sensor depending upon state of the camera controller, and a synchronizing signal generator for controlling the signal processing unit and the timing generator.

The operation of the circuit as shown in FIG. 1 will be described hereinbelow. When the user picks up a object and chooses the first switch 10, the camera controller 12 generates control signals for photographing. The control signals generated from the camera controller 12 are applied to the timing generator 20 and the mechanical controller 28. The synchronizing signal generator 18 supplies the timing generator 20 and the signal processing unit 16 with vertical and horizontal synchronizing signals. The timing generator 20 provided with the synchronizing signal and the timing control signal, supplies a clock signal synchronized with the vertical and horizontal synchronizing signals according to the timing control signal, to the image sensor 14 having CCD. The image sensor 14 provided with the clock signal photographs the object and converts the image signals into the electric image signals, which are applied to the signal processing unit 16. The signal processing unit 16 divides the image signal into the chrominance and the luminance signals. The modulator 22 frequency modulates and low-pass filters the chrominance and luminance signals generated from the signal processing unit 16. The recording/reproducing amplifier 24 receiving the outputs of the modulator 22 mixes, switches and amplifies the signals, which are supplied to the floppy disc driver 26 in the recording mode. In reproduction mode, the recording/reproduced amplifier 24 amplifies the reproducing signal from the floppy disc driver 26 and applies the reproduced signal to the AGC 34.

The mechanical controller 28, operating in accordance with the recording control signal and the reproducing control signal, controls the motor driving unit 32 in order to record the image data or read the recorded data in the floppy disc driver 26 depending on the control signals. Moreover, the mechanical controller 28 controls the erasing unit 30 which performs an erasing function, according to the control of the camera controller 12. The reproducer controller 38, operating according to the selection of the second switch, supplies the reproducing control signal to the mechanical controller 26 which controls the motor driving unit 32 in response to the reproducing control signal. The still video data stored in the floppy disc is applied to the recording/reproducing amplifier 24. That is, the image signals from the image sensor 14 according to the control of the camera controller 12 are recorded in the floppy disc driver 26, and the recorded image signals are read from the floppy disc driver 26 according to the control of the reproducer controller 38.

When the reproduced image signals are supplied to the AGC 34 according to the above-described operations, the chrominance signal and the luminance signal are radio frequency signal processed and gain and amplification controlled in the AGC 34.

The demodulator 40 demodulates the chrominance signal and the luminance signal which are gain controlled by the AGC 34 and supplied to the encoder 42. The encoder 42 generates the composite signals by encoding the demodulated chrominance and luminance signals according to the pulses from the pulse generator 44. That is, the data of one still screen is generated from the encoder 42.

However, the conventional still video camera illustrated in FIG. 1 reproduces the image signals recorded in the floppy disc by one screen in case of reproduction. Explaining in detail, since the floppy disc has 50 tracks, fifty screens are recorded in case of field recording, and twenty five screens are recorded in case of frame recording. That is, one track has one screen of data in case of field recording, while two tracks have one screen of data in case of frame recording. In general, only the data recorded in one track is displayed on the one screen, so that one screen of data can be reproduced.

SUMMARY OF THE INVENTION

Therefore, it is an object of the present invention to provide a still video camera for simultaneously reproducing a plurality of image source signals recorded in a plurality of recording tracks on a plurality of subscreens, or reproducing an image source signal recorded in one track on a plurality of sub-screens, by using a multi-screen memory.

According to an aspect of the present invention, a still video camera having a modulator, a recording/reproducing amplifier, a demodulator, a camera controller, and reproducer controller, includes: a microprocessor for generating recording/reproducing commands by analyzing a mode control signal generated according to mode selections; a multi-screen controller for generating an A/D and D/A conversion sampling clocks, a multi-screen recording/reproducing control signal, and first and second switching control signals according to the recording/reproducing commands of the microprocessor; a A/D converter for converting modulated analog signals into digital signals according to the A/D conversion sampling clock; an analog switch for supplying the luminance signal, the first and second chrominance signals to the A/D converter according to the first switching control signal; multi-screen memories for recording multi-screen image signals in response to the multi-screen recording/reproducing control signal generated from the multi-screen controller; D/A converters for generating luminance signal, and a first and second chrominance signals by converting the signals generated from the recording media into analog signals according to the D/A conversion sampling clock of the multi-screen controller; a video switch for selectively generating the image signals, and the luminance signal, and the first and second chrominance signals from the D/A converters according to the second switching control signal; and an encoder for encoding the signal generated from the video switch and a synchronizing signal so as to generate composite image signals.

BRIEF DESCRIPTION OF THE DRAWINGS

For a better understanding of the invention and to show how the same may be carried into effect, reference will now be made, by way of example, to the accompanying diagrammatic drawings, in which.

DETAILED DESCRIPTION OF THE PREFERRED EMBODIMENT

Figure 1:
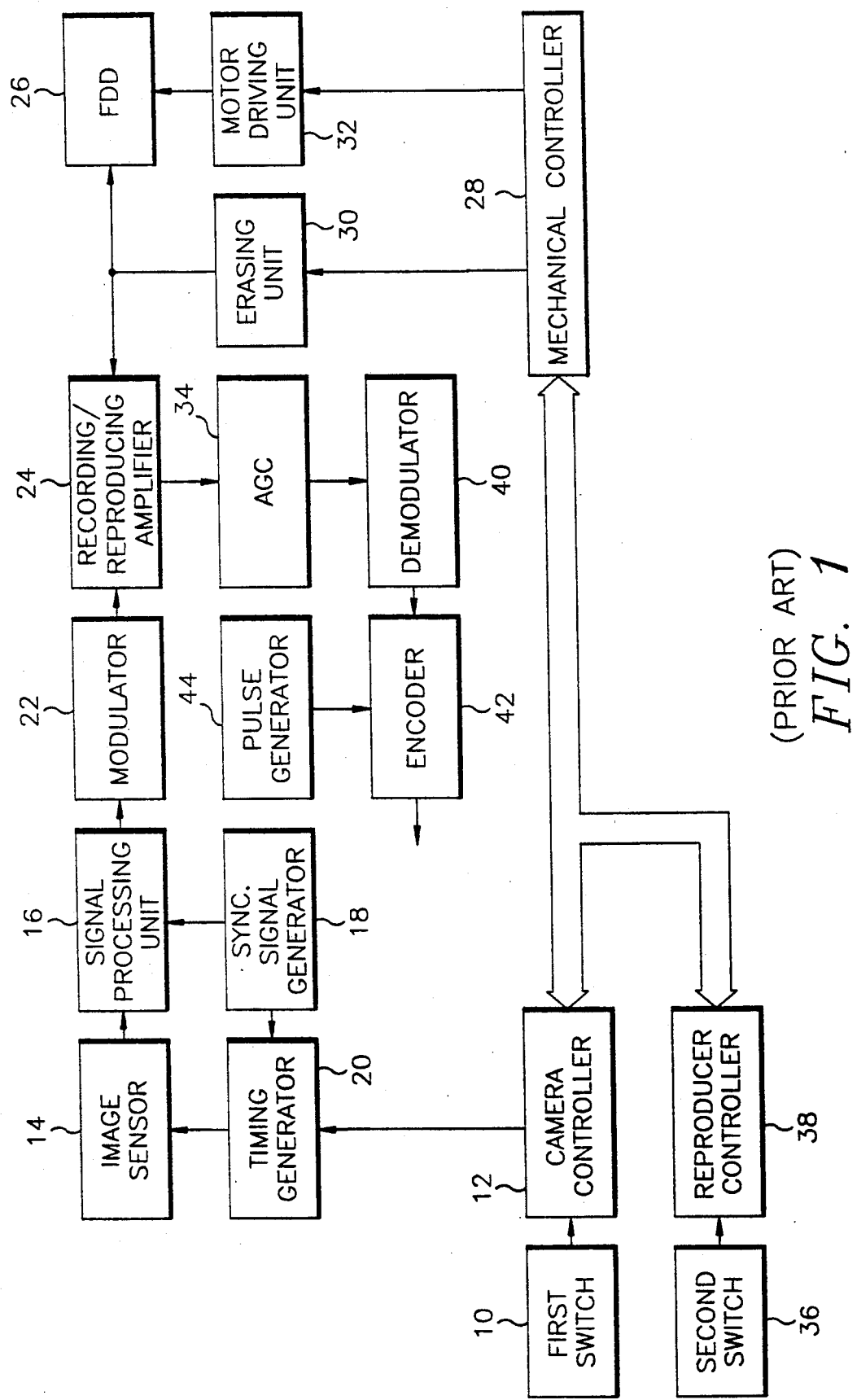
FIG. 1 illustrates a block diagram of a conventional still video camera.
Figure 2:
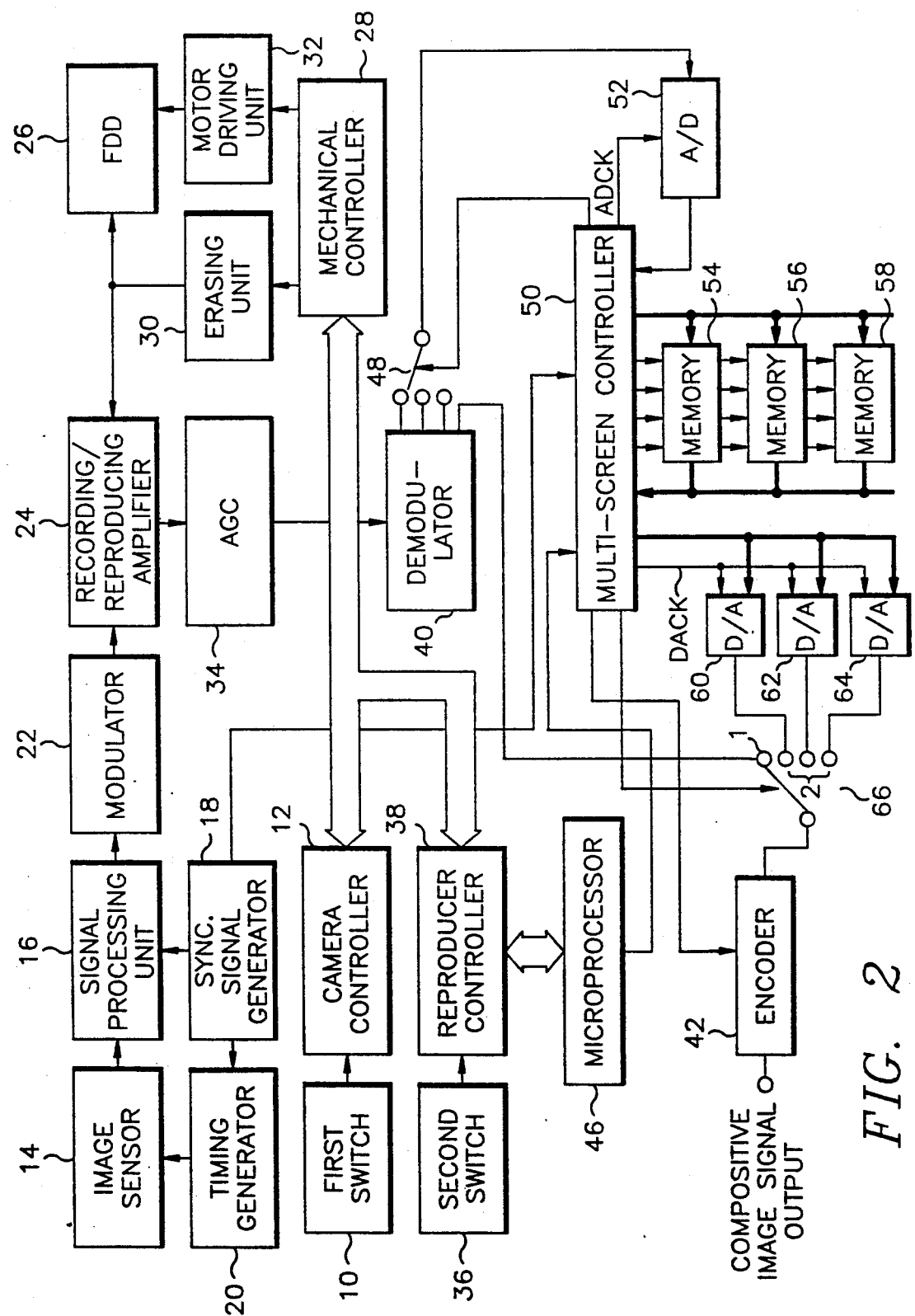
FIG. 2 illustrates a block diagram of a still video camera in accordance with the present invention.

Referring to FIG. 2, the microprocessor 46 generates a recording/reproducing command by analyzing a control signal according to mode selection. The multi-screen controller 50 generates an A/D conversion sampling clock ADCK, a D/A conversion sampling clock DACK, the multi-screen recording/reproducing control signal and a first and second switching control signals according to a recording/reproducing command of the microprocessor 46. The A/D converter 52 converts analog signals into digital signals by means of A/D conversion sampling clock ADCK. The luminance signal Y, and the first and second chrominance signals R-Y, B-Y are supplied to the A/D converter 52 under the control of the first switching control signal through the analog switch 48. In the multi-screen memories 54, 56, 58, the data from the multi-screen controller 50 are stored according to the multi-screen recording/reproducing control signal. The D/A converters 60, 62, 64 convert the data generated from the memories 54, 56, 58 by way of the multi-screen controller 50 into analog signals which are the luminance signal Y, and the first and second chrominance signals R-Y, B-Y, under the control of the D/A conversion sampling clock DACK. One of the image signal, the luminance signal Y, the first and second chrominance signals R-Y, B-Y from the D/A converters are selected by the video switch 66 under the control of the second switching control signal. The signal through the video switch 66 and the synchronizing signal are encoded by the encoder 42 which generates a composite signal. The analog switch 48 is connected to the output terminal of the demodulator 40 as shown in FIG. 1, and the microprocessor 46 is connected to the reproduction controller 38.

Figure 3:
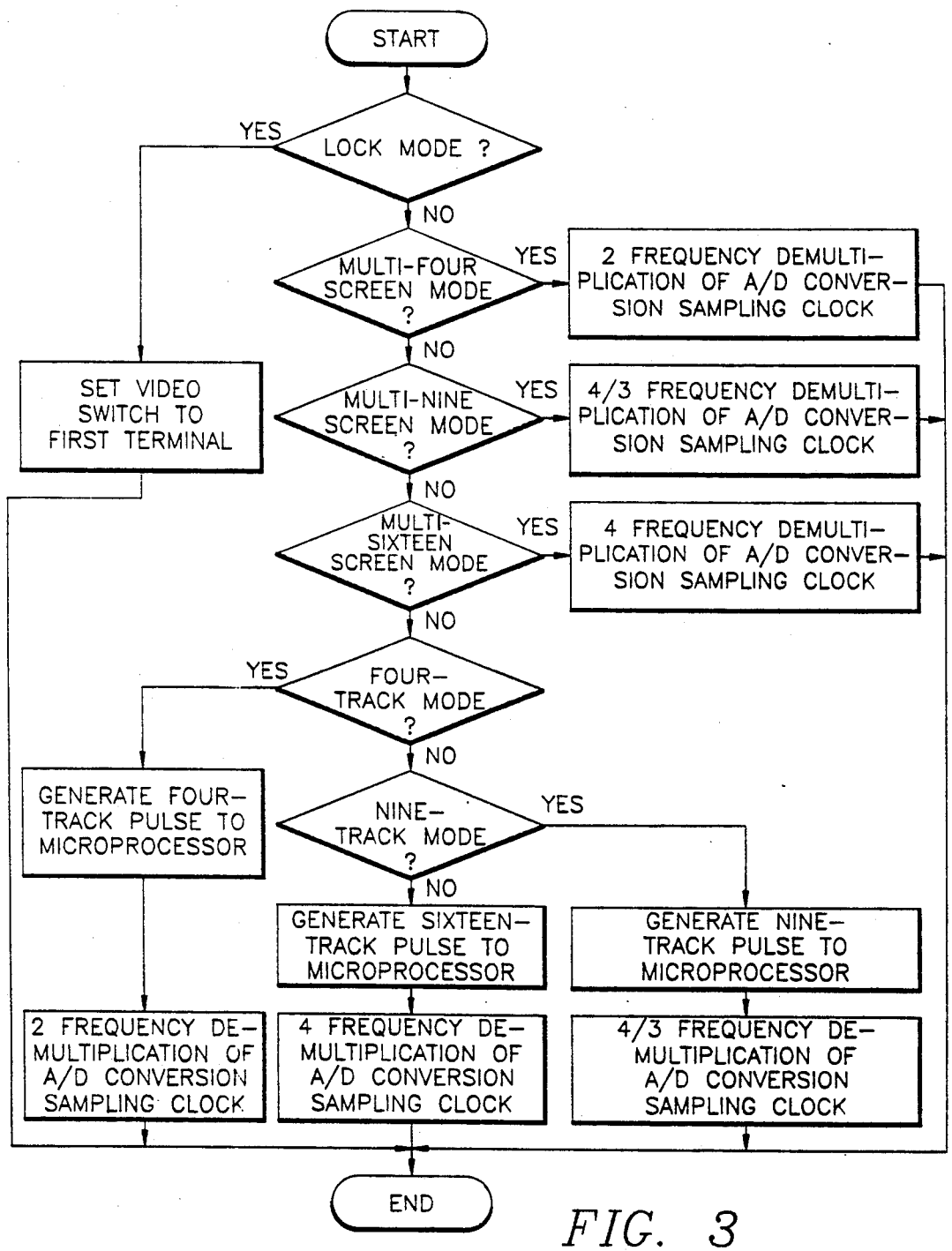
FIG. 3 illustrates a flow chart of the operation of the still video camera in accordance with the present invention.

FIG. 3 shows a flow chart for descriptively explaining the operation in accordance with the present invention.

Figure 4A:
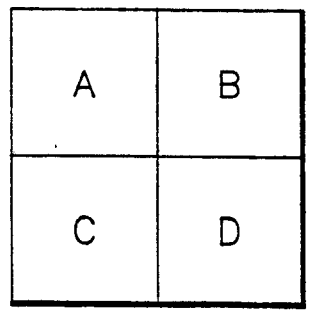
FIG. 4 illustrates a screen allocation diagram in accordance with the present invention.
Figure 4B:
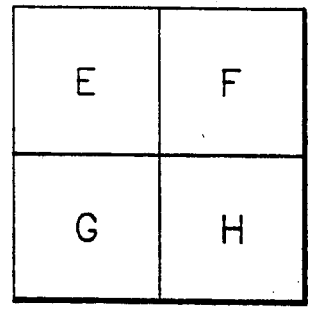

Referring to FIGS. 4A and 4B, the reproduced multi-screen display status diagrams are described as an example, in accordance with the present invention. The case that image signal recorded in one track is divided into four screens as shown in FIG. 4A, each of which is the same image. An image recorded in one track is simultaneously displayed on four sub-screens. FIG. 4B represents the case that the images respectively recorded in four tracks are respectively displayed on four screens, and each screen is a different image.

With reference to FIG. 3 to FIG. 4B, if the user sets the lock mode by use of the second switch 36, the reproducer controller 38 controls the mechanical controller 28 and applies the lock signal into the microprocessor 46. Here, the explanations of the recording operation and the reproducing operation are omitted, because those operations are the same as the operations described in FIG. 1. Accordingly, the image data recorded in the floppy disc is picked up by the reproducing operation, and is demodulated as the luminance signal Y, and the first and second chrominance signals R-Y, B-Y.

On the other hand, the microprocessor 46 controls the multi-screen controller 50 according to the control signal. In this case, the multi-screen controller 50 controls the video switch 66 so that the demodulator 40 applies the video signals into the encoder 42 through the video switch 66. The encoder 42 generates the composite signals by encoding the video signal and the synchronizing signal.

If the multi-screen display operation is selected by the second switch 36, the microprocessor 46 controls read/write and timing of the multi-screen controller 50 according to command of the function selection under the control of the reproducer controller 38.

For example, in case of multi-four screens, the A/D conversion sampling clock ADCK is divided by two. The A/D conversion sampling clock ADCK is divided by 4/3 in case of multi-nine screens, and is divided by 4 in case of multi-sixteen screens. In this case, the multi-screen controller 50 provided with the write/read signal and the timing control signal sequentially switches the analog switch 48 so that the luminance signal Y, and the first and second chrominance signals R-Y, B-Y may be applied to the A/D converter 52. The luminance signal Y, the first and second chrominance signals R-Y, B-Y are converted into digital signals depending upon the A/D conversion sampling clock ADCK and then, applied to the multi-screen controller 50. In this case, the period of the A/D conversion sampling clock ADCK from the multi-screen controller 50 is changed according to the display mode. That is, the frequency of the A/D conversion sampling clock ADCK is 2fsc in case of multi-four screens, 4/3fsc in case of multi-nine screens, and 4fsc in case of multi-sixteen screens, which is generated from the multi-screen controller 50 according to the control of the microprocessor 46.

The signals from the A/D converter 52 are recorded in the memories 54, 56, 58 according to the control of the multi-screen controller 50, and the capacities of the memories 54, 56, 58 are variable according to the multi-screen controller 50. The signals recorded in the memories 54, 56, 58 are read under the control of the multi-screen controller 50 and converted into analog signals through the D/A converters 60, 62, 64. The D/A converter 60 converts the luminance signal Y into the analog signal, while the D/A converters 62 and 64 convert the first chrominance signal R-Y and the second chrominance signal B-Y into the analog signals respectively.

Therefore, the multi-screen controller 50, in case of recording, controls the signal from the analog switch 48 and the A/D converter 52 under the control of the synchronizing signal for recording generated by synchronizing signal generator 18 and the clock 4fsc for recording, and provides the control signals needed for controlling the memories 54, 56, 58 in order to record the data while recording. In case of reading, the multi-screen controller 50 controls a series of the reading operation by generating the memory read control signal, the signals from the D/A converters 60, 62, 64 and the video switch control signal, under the control of the synchronizing signal for reading and the clock 4fsc for reading.

When the luminance signal Y, the first and second chrominance signals R-Y, B-Y are sequentially applied to the encoder 42 by way of the video switch 66, the encoder 42 generates the composite signal after sequentially encoding the signal applied through the video switch 66 and the synchronizing signal. In this case, since the image signals from the encoder 42 are the data stored in the memories 54, 56, 58 introduced to provide a multi-screen display, the image signals displayed on the multi-screen coincide with the selected multi-mode or track code as shown in FIGS. 4A and 4B.

As described hereinabove, in use of a multi-screen memory, the present invention enables an image source signal recorded in one track to be displayed on multiple sub-screens, or enables multiple image source signals recorded in corresponding recording tracks thereof to be displayed on respective sub-screens which are arranged on a main screen. Thereby, the video still camera invented may markedly improve its performance.

While the invention has been particularly shown and described with reference to a preferred embodiment, it will be understood by those skilled in the art that modifications in detail may be made without departing from the spirit and scope of the invention.

What is claimed is:

1. A still video camera for recording or reproducing a still picture, including modulating means for generating a frequency modulated synchronizing signal by receiving a signal which is generated by photographing an object, recording/reproducing means for recording/reproducing the signals output from said modulating means on or/and from a recording media, demodulating means for demodulating the signals generated from said recording media so as to produce a luminance signal and a first and second chrominance signals, camera controlling means for supplying recording control signals to said modulating means and the recording/reproducing means according to a recording switching signal, and reproducer controlling means for supplying a reproducing control signal and a reproducing mode control signal to said recording/reproducing means according to a reproducing switching signal, comprising:

a microprocessor for generating recording/reproducing commands by analyzing a mode control signal generated according to mode selections;

multi-screen controlling means for generating an A/D and D/A sampling clocks, a multi-screen recording/reproducing control signal, a first and second switching control signals according to the recording/reproducing commands of the microprocessor;

A/D converting means for converting analog signals into digital signals according to said A/D conversion sampling clock;

an analog switch for supplying said luminance signal, said first and second chrominance signals to said A/D converting means according to said first switching control signal;

multi-screen memory means having a plurality of memories for recording/reproducing multi-screen image signals in response to said multi-screen recording/reproducing control signal generated from said multi-screen controller;

D/A converting means having a plurality of D/A converters for generating a luminance signal, and a first and second chrominance signals by converting the signals generated from said recording media into analog signals according to said D/A conversion sampling clock of said multi-screen controller;

video switching means for selectively generating the image signals, and the luminance signal, and the first and second chrominance signals from the D/A converting means according to the second switching control signal; and an encoder for encoding the signal generated from said video switching means and a synchronizing signal so as to generate composite image signals.

* * * * *

UNITED STATES PATENT AND TRADEMARK OFFICE
CERTIFICATE OF CORRECTION

PATENT NO.   : 5,111,300
DATED        : 5 May 1992
INVENTOR(S)  : Seok-Hoon NAM

It is certified that error appears in the above-identified patent and that said Letters Patent is hereby corrected as shown below:

IN THE ABSTRACT

Column 2, Line 24, replace "sysnchronizing" with

--synchronizing--.

Signed and Sealed this

Thirteenth Day of July, 1993

Attest:

MICHAEL K. KIRK

Attesting Officer

Acting Commissioner of Patents and Trademarks